(12) United States Patent
Skvortsov et al.

(10) Patent No.: US 7,613,581 B2
(45) Date of Patent: Nov. 3, 2009

(54) METHOD, APPARATUS, AND MEDIUM FOR CALIBRATING COMPASS SENSOR IN CONSIDERATION OF MAGNETIC ENVIRONMENT AND METHOD, APPARATUS, AND MEDIUM FOR MEASURING AZIMUTH USING THE COMPASS SENSOR CALIBRATION METHOD, APPARATUS, AND MEDIUM

(75) Inventors: Vladimir Skvortsov, Yongin-si (KR);
Seok-won Bang, Seoul (KR);
Hyoung-ki Lee, Seongnam-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 245 days.

(21) Appl. No.: 11/892,529

(22) Filed: Aug. 23, 2007

(65) Prior Publication Data
US 2008/0071492 A1 Mar. 20, 2008

(30) Foreign Application Priority Data
Sep. 20, 2006 (KR) ...................... 10-2006-0091368

(51) Int. Cl.
*G01C 17/38* (2006.01)
(52) U.S. Cl. .......................... 702/92; 33/356
(58) Field of Classification Search ............. 702/92–94, 702/85, 190, 188; 33/356, 355 R, 357
See application file for complete search history.

(56) References Cited

U.S. PATENT DOCUMENTS

| 4,414,753 | A | | 11/1983 | Moulin et al. | |
| 4,698,912 | A | * | 10/1987 | Fowler et al. | 33/356 |
| 4,870,602 | A | | 9/1989 | Bäumker | |
| 5,151,872 | A | | 9/1992 | Suzuki et al. | |
| 5,349,529 | A | | 9/1994 | Masumoto et al. | |
| 5,828,984 | A | | 10/1998 | Cage et al. | |
| 6,282,803 | B1 | * | 9/2001 | Dunne | 33/361 |
| 6,651,003 | B2 | * | 11/2003 | Woloszyk et al. | 701/224 |
| 7,451,549 | B1 | * | 11/2008 | Sodhi et al. | 33/356 |
| 2004/0107064 | A1 | * | 6/2004 | Cho et al. | 702/92 |
| 2005/0160609 | A1 | * | 7/2005 | Kwon et al. | 33/356 |

FOREIGN PATENT DOCUMENTS

JP 9-068431 3/1997
KR 10-2005-0046298 5/2005

* cited by examiner

*Primary Examiner*—Edward Raymond
(74) *Attorney, Agent, or Firm*—Staas & Halsey LLP

(57) ABSTRACT

A method of calibrating a compass sensor in consideration of a magnetic environment is provided. The method includes (a) acquiring magnetic force data by rotating a compass sensor 360 degrees, the compass sensor including a biaxial magnetometer, (b) fitting the acquired magnetic force data to an ellipse function, (c) transforming the acquired magnetic force data and the ellipse function into a circle which is centered on an origin, and (d) calculating a distortion factor based on an inclination of a major axis of the ellipse function or the acquired magnetic force data to a horizontal axis, the distortion factor indicating the degree to which a magnetic field is distorted.

26 Claims, 11 Drawing Sheets

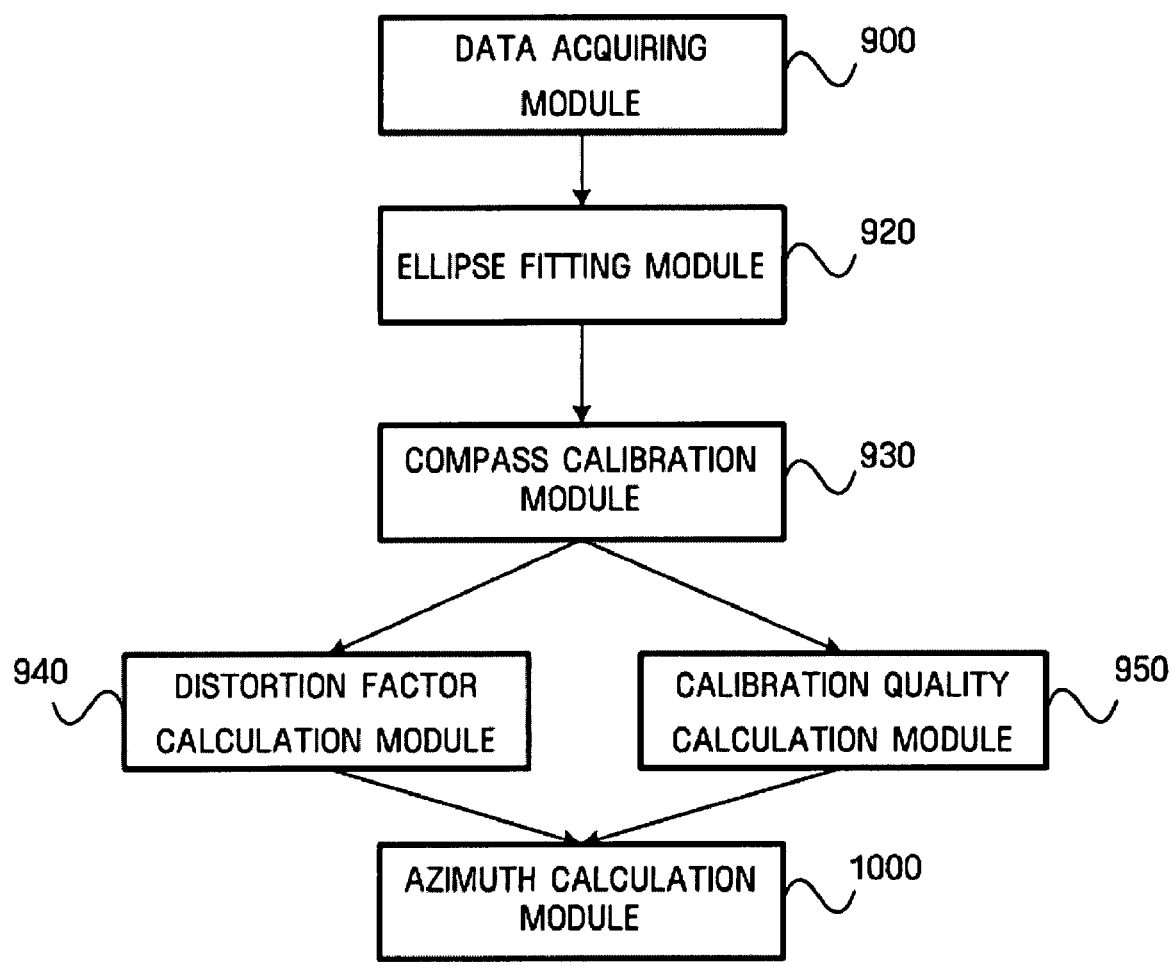

METHOD, APPARATUS, AND MEDIUM FOR CALIBRATING COMPASS SENSOR IN CONSIDERATION OF MAGNETIC ENVIRONMENT AND METHOD, APPARATUS, AND MEDIUM FOR MEASURING AZIMUTH USING THE COMPASS SENSOR CALIBRATION METHOD, APPARATUS, AND MEDIUM

CROSS-REFERENCE TO RELATED APPLICATIONS

This application claims priority benefit from Korean Patent Application No. 10-2006-0091368 filed on Sep. 20, 2006 in the Korean Intellectual Property Office, the disclosure of which is incorporated herein by reference in its entirety.

BACKGROUND

1. Field

Embodiments relate to a method, apparatus, and medium for calibrating a compass sensor and calculating the quality of the calibration of the compass sensor and a distortion factor, and more particularly, to a method, apparatus, and medium for calibrating azimuth data acquired by a compass sensor and evaluating the quality and distortion of the calibrated azimuth data.

2. Description of the Related Art

Compass sensors have been widely used in various modern products. In particular, compass sensors have been adopted in a variety of transportation vehicles such as ships, planes, and automobiles as a tool for determining the heading direction of transportation vehicles. Also, compass sensors have been adopted in mobile robots that can autonomously travel from place to place as a tool for determining the traveling direction of mobile robots.

Compass sensors measure an inclination with respect to the due north of the Earth as an absolute azimuth by using an absolute coordinate system in which the due north of the Earth is regarded as one axis. Compass sensors can perform direction measurement due to minute magnetic fields that exist on the Earth.

Most compass sensors result in minor errors due to interference from a minor magnetic field. For example, assume that a compass sensor is installed in a mobile robot and that the mobile robot travels inside an apartment building. Various electronic products such as TVs, refrigerators, stereos, treadmills, and microwave ovens which can be used in an apartment building may affect a magnetic field in the apartment building. Since the Earth magnetism generates a weak magnetic field, data sensed by a compass sensor may be partially erroneous due to external magnetic interference with the compass sensor.

Therefore, in order to obtain precise azimuth data, data of a compass sensor needs to be calibrated. U.S. Pat. No. 4,414,753 discloses a technique of compensating a magnetometer which includes acquiring data with the aid of a magnetometer by rotating a vehicle 360 degrees; forming an ellipse based on the acquired data; transforming the ellipse into a circle; calculating a plurality of parameters regarding the ellipse and the circle; and compensating the magnetometer by performing hard iron compensation and soft iron compensation on the magnetometer using the parameters.

U.S. Pat. No. 5,828,984 discloses a technique of calibrating a compass sensor which involves acquiring elliptical trajectory data by rotating a compass sensor 360 degrees; determining the lengths of major and minor axes of the elliptical trajectory data and the angular deviation of the elliptical trajectory data from true magnetic north; and transforming the elliptical trajectory data into a circle by performing linear transformation according to the results of the determination.

Japanese Patent Laid-Open Gazette No. 1997-068431 discloses a technique of calibrating a compass sensor which involves fitting the output of a magnetic sensor to an ellipse and transforming the ellipse into a circle by calibrating a set of parameters regarding the ellipse.

The aforementioned conventional calibration techniques simply involve calibrating a compass sensor by transforming a geometrical figure obtained through simple fitting into a circle. In addition, no methods have yet been suggested to calibrate both data acquired by a compass sensor and an ellipse to which the acquired data is fit at the same time.

Moreover, in the aforementioned conventional compass sensor calibration techniques, data acquired by a compass sensor is fit to an ellipse, and then, the ellipse is readily transformed into a circle. Thus, it is impossible to determine whether a compass sensor has been properly calibrated and verify the reliability of data acquired by the compass sensor.

SUMMARY

Embodiments provide a method, apparatus, and medium for calibrating a compass sensor by introducing a distortion factor and calculating the quality of calibration.

Embodiments also provide a method, apparatus, and medium for determining the reliability of data of a compass sensor based on a distortion factor and the quality of calibration and measuring the azimuth of the compass sensor based on the results of the determination.

According to an aspect of embodiments, there is provided a method of calibrating a compass sensor in consideration of a magnetic environment, the method may include (a) acquiring magnetic force data by rotating a compass sensor 360 degrees, the compass sensor including a biaxial magnetometer, (b) fitting the acquired magnetic force data to an ellipse function, (c) transforming the acquired magnetic force data and the ellipse function into a circle which is centered on an origin, and (d) calculating a distortion factor based on an inclination of a major axis of the ellipse function or the acquired magnetic force data to a horizontal axis, the distortion factor indicating the degree to which a magnetic field is distorted.

According to another aspect of embodiments, there is provided a method of measuring the azimuth of a compass sensor in consideration of a magnetic environment, the method may include (a) acquiring magnetic force data by rotating a compass sensor 360 degrees, the compass sensor including a biaxial magnetometer, (b) fitting the acquired magnetic force data to an ellipse function, (c) transforming the acquired magnetic force data and the ellipse function into a circle which is centered on an origin, (d) calculating a distortion factor based on an inclination of a major axis of the ellipse function or the acquired magnetic force data to a horizontal axis, the distortion factor indicating the degree to which a magnetic field is distorted, and (e) calculating the azimuth of the compass sensor based on calibrated data of the compass sensor if the distortion factor is within a predefined threshold range.

According to another aspect of embodiments, there is provided a method of measuring the azimuth of a compass sensor in consideration of a magnetic environment, the method may include (a) acquiring magnetic force data by rotating a compass sensor 360 degrees, the compass sensor comprising a biaxial magnetometer; (b) fitting the acquired magnetic force data to an ellipse function; (c) transforming the acquired magnetic force data and the ellipse function into a circle which is centered on an origin; (d) calculating quality of calibration by comparing the acquired magnetic force data and the ellipse function; and (e) calculating the azimuth of the compass sensor based on calibrated data of the compass sensor if the quality of calibration is within a predefined threshold range.

According to another aspect of embodiments, there is provided a method of measuring the azimuth of a compass sensor in consideration of a magnetic environment, the method may include (a) acquiring magnetic force data by rotating a compass sensor 360 degrees, the compass sensor comprising a biaxial magnetometer; (b) fitting the acquired magnetic force data to an ellipse function; (c) transforming the acquired magnetic force data and the ellipse function into a circle which is centered on an origin; (d) calculating a distortion factor based on an inclination of a major axis of the ellipse function or the acquired magnetic force data to a horizontal axis, and calculating quality of calibration by comparing the acquired magnetic force data and the ellipse function, the distortion factor indicating the degree to which a magnetic field is distorted; and (e) calculating the azimuth of the compass sensor based on calibrated data of the compass sensor if the distortion factor and the quality of calibration are both within respective corresponding predefined threshold ranges.

According to another aspect of embodiments, there is provided an apparatus for calibrating a compass sensor in consideration of a magnetic environment, the apparatus may include a data acquiring module which acquires magnetic force data by rotating a compass sensor 360 degrees, the compass sensor comprising a biaxial magnetometer; an ellipse fitting module which fits the acquired magnetic force data to an ellipse function; a compass calibration module which transforms the acquired magnetic force data and the ellipse function into a circle which is centered on an origin; and a distortion factor calculation module which calculates a distortion factor based on an inclination of a major axis of the ellipse function or the acquired magnetic force data to a horizontal axis, the distortion factor indicating the degree to which a magnetic field is distorted.

According to another aspect of embodiments, there is provided an apparatus for measuring the azimuth of a compass sensor in consideration of a magnetic environment, the apparatus may include a data acquiring module which acquires magnetic force data by rotating a compass sensor 360 degrees, the compass sensor comprising a biaxial magnetometer; an ellipse fitting module which fits the acquired magnetic force data to an ellipse function; a compass calibration module which transforms the acquired magnetic force data and the ellipse function into a circle which is centered on an origin; a distortion factor calculation module which calculates a distortion factor based on an inclination of a major axis of the ellipse function or the acquired magnetic force data to a horizontal axis, the distortion factor indicating the degree to which a magnetic field is distorted; and an azimuth calculation module which calculates the azimuth of the compass sensor based on calibrated data of the compass sensor if the distortion factor is within a predefined threshold range.

According to another aspect of embodiments, there is provided an apparatus for measuring the azimuth of a compass sensor in consideration of a magnetic environment, the apparatus may include a data acquiring module which acquires magnetic force data by rotating a compass sensor 360 degrees, the compass sensor comprising a biaxial magnetometer; an ellipse fitting module which fits the acquired magnetic force data to an ellipse function; a compass calibration module which transforms the acquired magnetic force data and the ellipse function into a circle which is centered on an origin; a calibration quality calculation module which calculates quality of calibration by comparing the acquired magnetic force data and the ellipse function; and an azimuth calculation module which calculates the azimuth of the compass sensor based on calibrated data of the compass sensor if the quality of calibration is within a predefined threshold range.

According to another aspect of embodiments, there is provided an apparatus for measuring the azimuth of a compass sensor in consideration of a magnetic environment, the apparatus may include a data acquiring module which acquires magnetic force data by rotating a compass sensor 360 degrees, the compass sensor comprising a biaxial magnetometer; an ellipse fitting module which fits the acquired magnetic force data to an ellipse function; a compass calibration module which transforms the acquired magnetic force data and the ellipse function into a circle which is centered on an origin; a distortion factor/calibration quality calculation module which calculates a distortion factor based on an inclination of a major axis of the ellipse function or the acquired magnetic force data to a horizontal axis, and calculates quality of calibration by comparing the acquired magnetic force data and the ellipse function, the distortion factor indicating the degree to which a magnetic field is distorted; and an azimuth calculation module which calculates the azimuth of the compass sensor based on calibrated data of the compass sensor if the distortion factor and the quality of calibration are both within respective corresponding predefined threshold ranges.

According to another aspect of embodiments, there is provided at least one computer readable medium storing computer readable instructions that control at least one processor to implement a method for calibrating a compass sensor in consideration of a magnetic environment, the method may include fitting acquired magnetic force data acquired by the compass sensor to an ellipse function; transforming the acquired magnetic force data and the ellipse function into a circle which is centered on an origin; and calculating a distortion factor based on an inclination of a major axis of the ellipse function or the acquired magnetic force data to a horizontal axis, the distortion factor indicating a degree to which a magnetic field is distorted.

According to another aspect of embodiments, there is provided at least one computer readable medium storing computer readable instructions that control at least one processor to implement a method for measuring the azimuth of a compass sensor in consideration of a magnetic environment, the method may include fitting acquired magnetic force data acquired by the compass sensor to an ellipse function; transforming the acquired magnetic force data and the ellipse function into a circle which is centered on an origin; calculating a distortion factor based on an inclination of a major axis of the ellipse function or the acquired magnetic force data to a horizontal axis, the distortion factor indicating the degree to which a magnetic field is distorted; and calculating the azimuth of the compass sensor based on calibrated data of the compass sensor if the distortion factor is within a predefined threshold range.

According to another aspect of embodiments, there is provided at least one computer readable medium storing computer readable instructions that control at least one processor to implement a method of measuring the azimuth of a compass sensor in consideration of a magnetic environment, the method may include fitting acquired magnetic force data acquired by the compass sensor to an ellipse function; transforming the acquired magnetic force data and the ellipse function into a circle which is centered on an origin; calculating quality of calibration by comparing the acquired magnetic force data and the ellipse function; and calculating the azimuth of the compass sensor based on calibrated data of the compass sensor if the quality of calibration is within a predefined threshold range.

According to another aspect of embodiments, there is provided at least one computer readable medium storing computer readable instructions that control at least one processor to implement a method of measuring the azimuth of a compass sensor in consideration of a magnetic environment, the method may include fitting acquired magnetic force data acquired by the compass sensor to an ellipse function; transforming the acquired magnetic force data and the ellipse function into a circle which is centered on an origin; calculating a distortion factor based on an inclination of a major axis of the ellipse function or the acquired magnetic force data to a horizontal axis, and calculating quality of calibration by comparing the acquired magnetic force data and the ellipse function, the distortion factor indicating the degree to which a magnetic field is distorted; and calculating the azimuth of the compass sensor based on calibrated data of the compass sensor if the distortion factor and the quality of calibration are both within respective corresponding predefined threshold ranges.

According to another aspect of embodiments, there is provided at least one computer readable medium storing computer readable instructions to implement methods of embodiments.

BRIEF DESCRIPTION OF THE DRAWINGS

These and/or other aspects, features, and advantages will become apparent and more readily appreciated from the following description of exemplary embodiments, taken in conjunction with the accompanying drawings of which:

FIG. 10 is a block diagram of an apparatus for measuring azimuth using a compass sensor according to an exemplary embodiment.

DETAILED DESCRIPTION OF EMBODIMENTS

Figure 1:
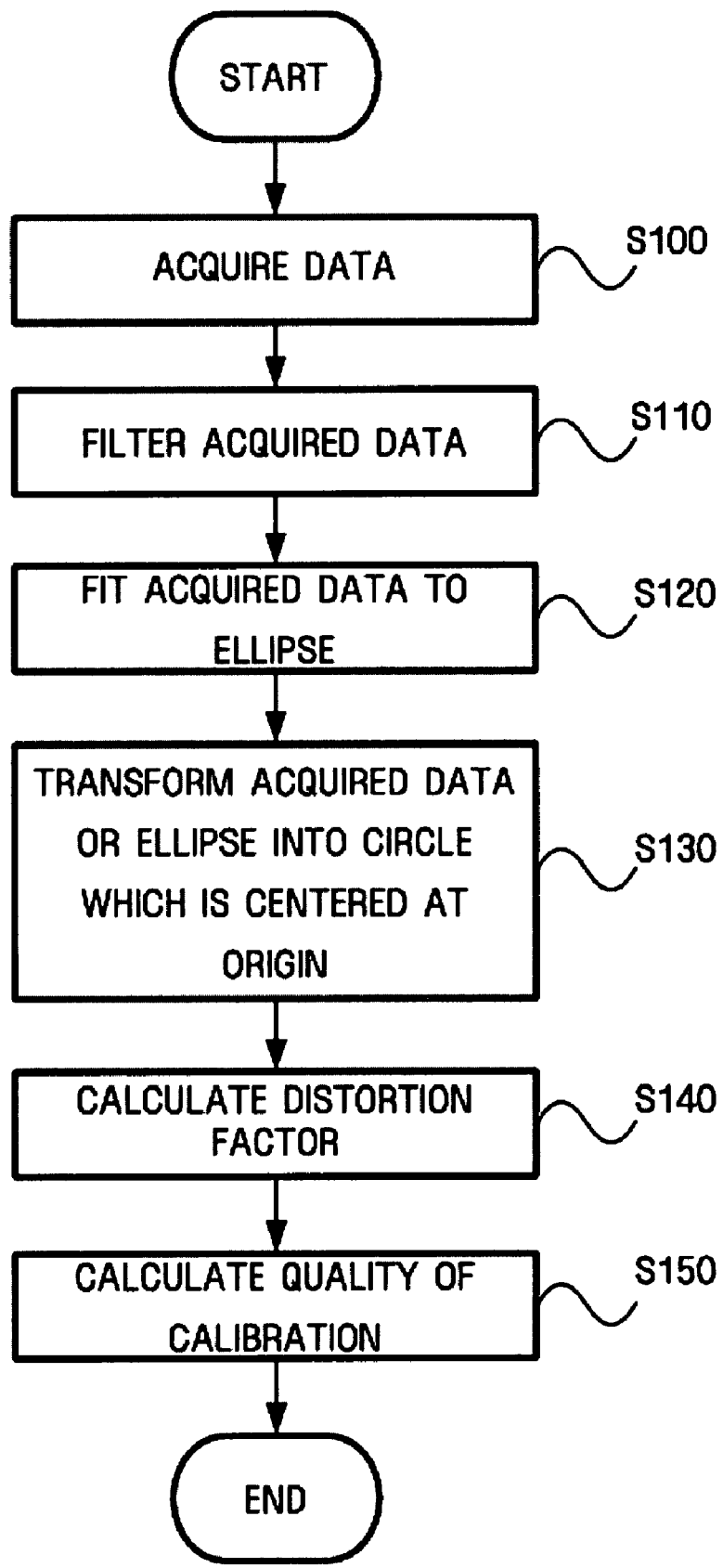
FIG. 1 is a flowchart illustrating a method of calibrating a compass sensor according to an exemplary embodiment.

Reference will now be made in detail to exemplary embodiments, examples of which are illustrated in the accompanying drawings, wherein like reference numerals refer to the like elements throughout. Exemplary embodiments are described below by referring to the figures.

FIG. 1 is a flowchart illustrating a method of calibrating a compass sensor according to an exemplary embodiment. Referring to FIG. 1, the method involves acquiring data (operation S100), filtering the acquired data (operation S110), fitting the filtered acquired data to an ellipse (operation S120), transforming the filtered acquired data and the ellipse into a circle which is centered at the origin (operation S130), calculating a distortion factor (operation S140), and calculating the quality of calibration (operation S150).

In detail, in operation S100, a plurality of data is acquired in order to calibrate a compass sensor. In detail, a plurality of data may be acquired by rotating a compass sensor that comprises a biaxial magnetometer 360 degrees. In other words, in operation S100, a number of magnetic line data respectively corresponding to a number of data points that the compass sensor passes by when being rotated 360 degrees is acquired. In operation S100, sampling speed may be appropriately determined so that a sufficiently large number of data can be acquired. Assuming that the number of data acquired by the compass sensor in operation S100 is n, the acquired data can be represented by Equation (1):

$$\begin{bmatrix} X_r \\ Y_r \end{bmatrix} = \begin{bmatrix} xr_1, xr_2, \cdots xr_n \\ yr_1, yr_2, \cdots yr_n \end{bmatrix} \quad (1)$$

where $X_r$ and $Y_r$ respectively indicate a set of x values and a set of y values of raw data acquired by a compass sensor.

Figure 2:
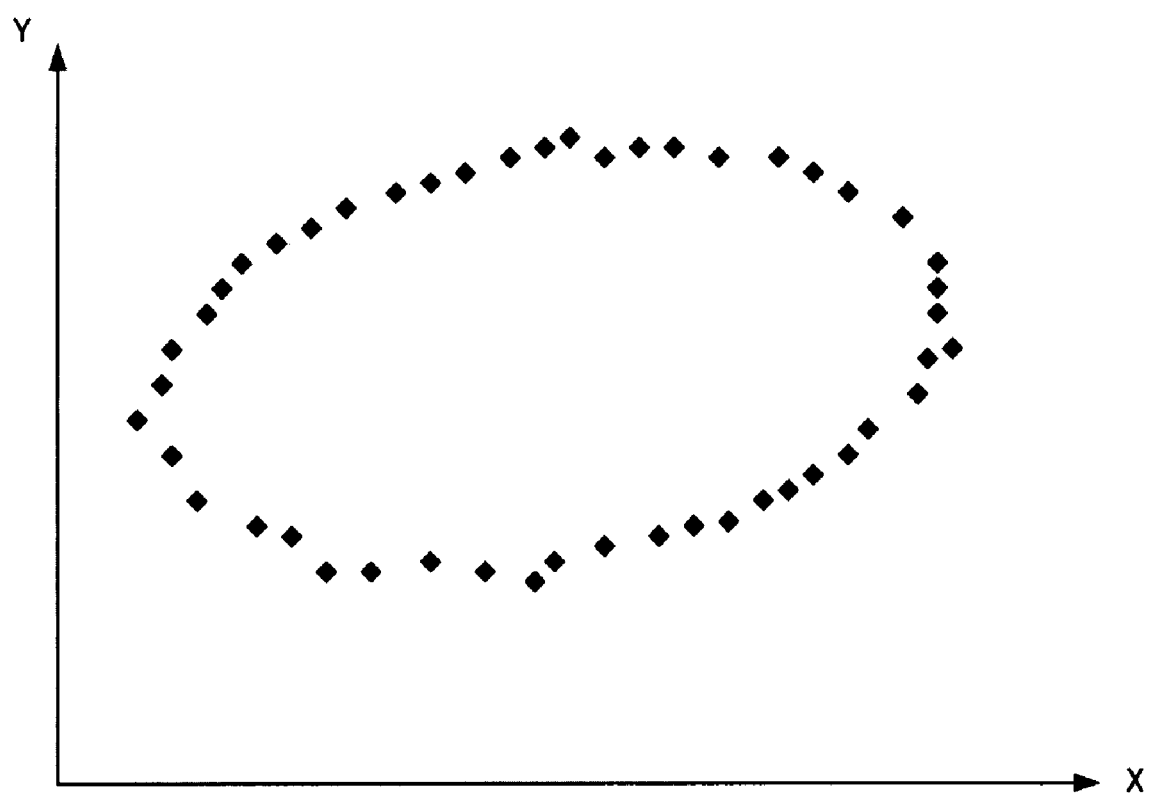
FIG. 2 is a diagram illustrating raw data acquired by rotating a compass sensor according to an exemplary embodiment.

FIG. 2 is a diagram illustrating raw data acquired by rotating a compass sensor according to an exemplary embodiment. Referring to FIG. 2, when raw data is acquired, a graph regarding the raw data can be drawn. Raw data acquired by a compass sensor may form a geometrical figure that is similar to an ellipse due to interference from a magnetic field caused by the surroundings of the compass sensor and a device in which the compass sensor is installed. Theoretically, when there is no interference from the surrounding magnetic field, raw data acquired by a compass sensor is expected to form a circle. However, in reality, raw data acquired by a compass sensor generally forms an ellipse due to the influence of the surrounding magnetic field.

Figure 3A:
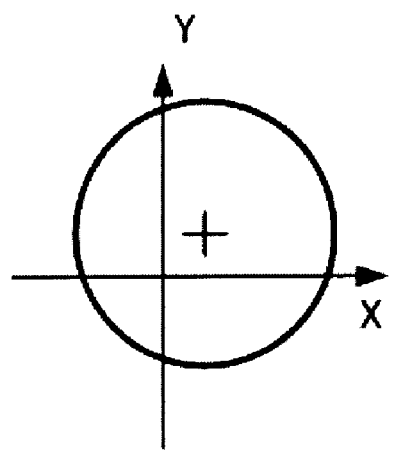
FIGS. 3A through 3C are diagrams for explaining three types of errors that can be caused by a compass sensor.
Figure 3B:
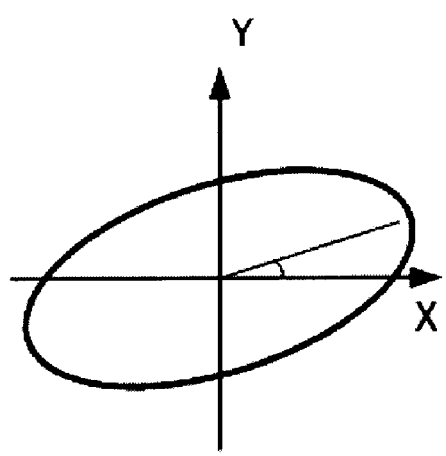
Figure 3C:
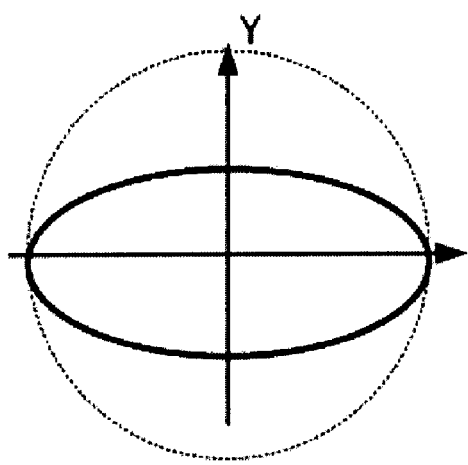

FIGS. 3A through 3C are diagrams for explaining three types of errors that can be included in raw data acquired by a compass sensor. Referring to FIG. 3, errors that can be included in raw data acquired by a compass sensor are generally classified into a hard iron error, a soft iron error, and a gain mismatch.

Referring to FIG. 3A, a hard iron error corresponds to the situation when the center of raw data deviates from the origin, and is also referred to as a hard iron offset. When a hard iron error occurs, all raw data deviates by a predetermined amount in both the direction of the x-axis and the direction of the y-axis.

Referring to FIG. 3B, a soft iron error corresponds to the situation when raw data is inclined in a certain direction. In other words, when the raw data forms an ellipse, the angle between the major axis of the ellipse and the x-axis is referred to as a soft iron error. A soft iron error indicates the extent to which the raw data deviates due to interference from a magnetic field.

Referring to FIG. 3C, a gain mismatch corresponds to the situation when raw data forms an ellipse and thus has a shorter main axial length than raw data that forms a circle. When there is no interference from the surrounding magnetic field, raw data acquired by a compass sensor is likely to form a circle. When raw data acquired by a compass sensor forms an ellipse due to the influence of the surrounding magnetic field, a gain mismatch occurs. In this case, the length of the minor axis of the ellipse may be elongated to be the same as the length of the major axis of the ellipse, thereby correcting the gain mismatch.

A compass sensor can be calibrated either using a direct calibration method that involves calibrating raw data acquired by the compass sensor or using an indirect calibration method that involves defining the raw data as a polynomial expression through filling and performing calibration using one or more coefficients used in the polynomial expression. Thus, three types of errors regarding raw data acquired by a compass sensor will hereinafter be referred to as a data hard iron offset, a data soft iron error, and a data scale factor, and three types of errors regarding an ellipse to which the raw data is fit will hereinafter be referred to as an ellipse hard iron offset, an ellipse soft iron error, and an ellipse scale factor.

Referring to FIG. 1, in operation S110, before the calibration of the raw data acquired in operation S100, a filtering operation is performed on the raw data so that useless raw data can be filtered by comparing a pair of magnetic force data respectively acquired from a pair of adjacent data points, deeming the pair of magnetic force data unreliable if the pair of magnetic force data differs greatly from each other, and filtering out the magnetic force data deemed unreliable. In detail, the filtering operation may be performed either by comparing a plurality of raw data respectively acquired from a plurality of adjacent data points, deeming one of the plurality of raw data that differs greatly from the rest of the plurality of raw data unstable, and filtering out the raw data deemed unstable or by comparing each raw data with the average of several raw data, deeming raw data that differs greatly from the average of the several raw data unstable, and filtering out the raw data deemed unstable.

In operation S120, assuming that the raw data acquired in operation S110 forms an ellipse, a fitting operation is performed on the raw data using an elliptic equation. The elliptic equation is as indicated by Equation (2):

$$F(\vec{a}, \vec{x}) = \vec{a} \cdot \vec{x} = ax^2 + bxy + cy^2 + dx + ey + f = 0 \quad (2)$$

where $\vec{a} = [a\ b\ c\ d\ e\ f]^T$ indicates a parameter vector, $\vec{x} = [x^2\ xy\ y^2\ xy\ 1]^T$ indicates a degree vector, and $F(\vec{a}, \vec{x})$ indicates the 'algebraic distance' of a point (x, y) to the $F(\vec{a}, \vec{x}) = 0$.

Equation (2) can be rearranged as a constrained ellipse fitting equation as indicated by Equation (3):

$$\text{minimizing } E = \|D \cdot \vec{a}\|^2 \text{ subject to the constraint } \vec{a}^T C \vec{a} = 1 \quad (3)$$

where $D = [x_1\ x_2\ \ldots\ x_n]^T$ indicates a design matrix, and C indicates a matrix regarding constrained conditions.

In order to solve Equation (3), a system formula can be derived using a Lagrange multiplier, $\lambda$. Then, the parameter vector $\vec{a} = [a\ b\ c\ d\ e\ f]^T$ can be found using the system of equations:

$$2D^T D \vec{a} - 2\lambda C \vec{a} = 0$$

$$\vec{a}^T C \vec{a} = 1$$

The system may be rewritten as $$S \vec{a} = \lambda C \vec{a}$$

$$\vec{a}^T C \vec{a} = 1 \quad (4)$$

where S is the scatter matrix $D^T D$.

Equation (4) can be solved using an eigenvectors. Once the parameter vector $\vec{a} = [a\ b\ c\ d\ e\ f]^T$ is found, the fitting of the raw data to an ellipse is complete. Then, a hard iron offset, a soft iron error, and a scale factor regarding the ellipse, i.e., an ellipse hard iron offset $(X_{fc}, Y_{fc})$, an ellipse soft iron error $\theta_f$, and an ellipse scale factor s, are calculated in order to calibrate the ellipse.

In operation S130, in order to calculate the ellipse hard iron offset $(X_{fc}, Y_{fc})$, the center of the ellipse is determined based on the parameter vector $\vec{a}$, as indicated by Equation (5):

$$X_{fc} = \frac{cd - bf}{b^2 - ac} \quad (5)$$

$$Y_{fc} = \frac{af - bd}{b^2 - ac}.$$

Thereafter, in operation S130, the ellipse soft iron error $\theta_f$, which is the inclination of the major axis of the ellipse with respect to the x-axis, can be determined by Equation (6):

$$\theta_f = 0.5 \tan^{-1}\left(\frac{2b}{c - a}\right) \quad (6)$$

where a, b, and c are components of the parameter vector $\vec{a}$ determined through ellipse fitting or coefficients of a polynomial equation.

The ellipse scale factor s indicates the ratio of the minor axis of the ellipse to the major axis of the ellipse. An axial length of the ellipse to which the raw data is fit is calculated as indicated by Equation (7):

$$S_1 = \sqrt{\frac{2(af^2 + cd^2 + gb^2 - 2bdf - acg)}{(b^2 - ac)\left[(c - a)\sqrt{1 + \frac{4b^2}{(a - c)^2}} - (c - a)\right]}} \quad (7)$$

$$S_2 = \sqrt{\frac{2(af^2 + cd^2 + gb^2 - 2bdf - acg)}{(b^2 - ac)\left[(a - c)\sqrt{1 + \frac{4b^2}{(a - c)^2}} - (c - a)\right]}}$$

where $S_1$ and $S_2$ indicate the lengths of two main semi-axes of the ellipse. Whichever of the main lengths $S_1$ and $S_2$ is greater than the other is the length of the major axis of the ellipse, and whichever of the main lengths $S_1$ and $S_2$ is less than the other is the length of the minor axis of the ellipse.

In operation S120, the calculation of a hard iron offset, a soft iron error, and a scale factor based on the raw data, i.e., the calculation of a data hard iron offset, a data soft iron error, and a data scale factor, may be performed in parallel with or after the calculation of the ellipse hard iron offset $(X_{fc}, Y_{fc})$, the ellipse soft iron error $\theta_f$, and the ellipse scale factor s, respectively.

The data hard iron offset is a type of hard iron, and is represented by the center or a representative value of the raw data. In operation S120, the center or the representative value of the raw data can be determined using two different methods, and the two methods will hereinafter be described in detail.

In the first method, the data hard iron offset can be calculated by averaging a set of raw data, as indicated by Equation (8):

$$x_h = \frac{1}{n}\sum_{i=1}^{n} xr_i \quad (8)$$

$$y_h = \frac{1}{n}\sum_{i=1}^{n} yr_i$$

where $x_h$ and $y_h$ respectively indicate x and y values of the data hard iron offset.

In the second method, the data hard iron offset $(x_h, y_h)$ can be calculated by averaging a maximum x value and a minimum x value of the raw data and averaging a maximum y value and a minimum y value of the raw data, as indicated by Equation (9):

$$x_h = (Xr_{max} + Xr_{min})/2$$

$$y_h = (Yr_{max} + Yr_{min})/2 \quad (9)$$

where $Xr_{max}$ and $Yr_{max}$ indicate the maximum x value and the maximum y value, respectively, of the raw data, and $Xr_{min}$ and $Yr_{min}$ indicate the minimum x value and the minimum y value, respectively, of the raw data. Accordingly, a magnetometer range ($xr_{range}$, $yr_{range}$) of the raw data may be defined as indicated by Equation (10):

$$xr_{range} = (Xr_{max} - Xr_{min})$$

$$yr_{range} = (Yr_{max} - Yr_{min}) \quad (10)$$

The data hard iron offset $(x_h, y_h)$ may be corrected as indicated by the following equation. As a result of the correction of the data hard iron offset $(x_h, y_h)$, raw data that forms a circle or an ellipse which is centered at the origin can be obtained.

After the calculation of the data hard iron offset $(x_h, y_h)$, a data soft iron error $\theta_{mi}$ may be calculated. The data soft iron error $\theta_{mi}$ indicates the angle between the major axis of the ellipse formed by the raw data and the x-axis. In operation S130, the data soft iron error $\theta_{mi}$ may be calculated using the second moment of inertia, as indicated by Equation (11):

$$\theta_{mi} = \frac{\pi}{2} - \frac{1}{2}\tan^{-1}\left[\frac{2U_{xy}}{U_{xx} - U_{yy}}\right] \quad (11)$$

where $U_{xx}$, $U_{yy}$, and $U_{xy}$ respectively indicate the second moment of inertia about the x-axis, the second moment of inertia about the y-axis, and the second moment of inertial about the combination of the x-axis and the y-axis. The second moments $U_{xx}$, $U_{yy}$, and $U_{xy}$ of inertia may be determined by Equation (12):

$$U_{xx} = \frac{1}{n}\sum_{i=1}^{n}(xr_i - x_h)^2 \quad (12)$$

-continued $$U_{yy} = \frac{1}{n}\sum_{i=1}^{n}(yr_i - y_h)^2$$

$$U_{xy} = \frac{1}{n}\sum_{i=1}^{n}(xr_i - x_h)(yr_i - y_h).$$

Then, the data soft iron error $\theta_{mi}$, which is the inclination of raw data that forms an ellipse with respect to the x-axis, can be determined based on the second moments $U_{xx}$, $U_{yy}$, and $U_{xy}$ of inertia.

Thereafter, in operation S120, a data scale factor is the ratio of a major axis to a minor axis and is always greater than 1, and may be calculated using the magnetic field range ($xr_{range}$, $yr_{range}$) of the raw data which is determined by Equation (10), as indicated by Equation (13):

$$\text{if } (xr_{range} > yr_{range}) s = \frac{xr_{range}}{yr_{range}} \quad (13)$$

$$\text{else if } (yr_{range} \geq xr_{range}) s = \frac{yr_{range}}{xr_{range}}.$$

As described, in operation S120, an ellipse hard iron offset, an ellipse soft iron error, and an ellipse scale factor can be calculated in parallel with a data hard iron offset, a data soft iron error, and a data scale factor. Thus, in operation S130, the raw data or the elliptic function can be transformed into a circular shape which is centered at the origin by using the hard iron offsets $(X_{fc}, Y_{fc})$ and $(x_h, y_h)$, the soft iron errors $\theta_{mi}$ and $\theta_f$, and the scale factors s calculated in operation S120.

As described above, a hard iron offset, a soft iron error, and a scale factor can be calculated using two different methods. Thus, the transformation of the raw data or the elliptic function into a circle can be performed using the raw data, using the elliptic function, or using both the raw data and the elliptic function.

First of all, the hard iron offsets $(X_{fc}, Y_{fc})$ and $(x_h, y_h)$ calculated in operation S120 are corrected. In detail, the data hard iron offset $(x_h, y_h)$ can be corrected, as indicated by Equation (14):

$$\begin{bmatrix} X_{val} \\ Y_{val} \end{bmatrix} = \begin{bmatrix} Xr - x_h \\ Yr - y_h \end{bmatrix}, \quad (14)$$

where Xr and Xr are sets from (1).

The ellipse hard iron offset $(X_{fc}, Y_{fc})$ may be corrected in almost the same manner as the data hard iron offset $(x_h, y_h)$. In other words, the ellipse hard iron offset $(X_{fc}, Y_{fc})$ is subtracted from the elliptic equation so that the ellipse formed by the raw data can be centered at the origin.

After the correction of the hard iron offsets $(X_{fc}, Y_{fc})$ and $(x_h, y_h)$ calculated in operation S120, the soft iron errors $\theta_{mi}$ and $\theta_f$ calculated in operation S120 are corrected. Both $\theta_{mi}$ and $\theta_f$ are calculated using two different methods but they represent the same soft iron error. Final selection of the $\theta$ (value for calibration procedure) reduces to choice between $\theta_{mi}$ and $\theta_f$. A preference one over another is determined experimentally and depends on stability of the calibration results.

The soft iron error $\theta$ can be corrected by rotating the raw data or the ellipse to which the raw data is fit clockwise by a predetermined amount so that the major axis of the corresponding ellipse can coincide with the x-axis. In detail, the data soft iron error θ is corrected by rotating the raw data clockwise by an amount corresponding to the data soft iron error θ, as indicated by Equation (15):

$$\begin{bmatrix} X_{rot_1} \\ Y_{rot_1} \end{bmatrix} = \begin{bmatrix} \cos(-\theta) & -\sin(-\theta) \\ \sin(-\theta) & \cos(-\theta) \end{bmatrix} \begin{bmatrix} X_{val} \\ Y_{val} \end{bmatrix}. \qquad (15)$$

The ellipse soft iron error $\theta_f$ can be corrected in almost the same manner as the data soft iron error $\theta_{mi}$. In other words, the ellipse soft iron error $\theta_{mi}$ can be corrected by rotating the elliptic equation clockwise by an amount corresponding to the ellipse soft iron error $\theta_{mi}$.

After the correction of the soft iron error θ and calculated in operation S120, calibration is performed by applying the scale factors s calculated in operation S120 so that a gain mismatch can be corrected. The application of the scale factors s may be performed after the correction of the hard iron offsets $(X_{fc}, Y_{fc})$ and $(x_h, y_h)$ and the soft iron errors $\theta_{mi}$ and $\theta_f$. The application of the scale factors s may be conducted in such a manner that pairs of coordinates corresponding to the heading direction of the minor axis of the corresponding ellipse can be multiplied by the data or ellipse scale factor s. As a result of the application of the ellipse and data scale factors s, the ellipse formed by the raw data can be transformed into a circle.

After the application of the scale factors calculated in operation S120, the raw data or the ellipse to which the raw data is fit is rotated counterclockwise by as much as the soft iron error θ. As described above, the raw data or the ellipse is rotated clockwise by the amount corresponding to the soft iron error θ, and then is transformed into a circle by applying the data or ellipse scale factor s. The clockwise rotation of the raw data or the ellipse by the amount corresponding to the soft iron error θ is prerequisite for the application of the data or ellipse scale factor s. Thus, once the application of the data or ellipse scale factor s is complete, the clockwise rotation of the raw data or the ellipse needs to be compensated for by rotating the raw data or the ellipse counterclockwise. Therefore, according to the present exemplary embodiment, the raw data or the ellipse is rotated counterclockwise by the amount corresponding to the soft iron error $\theta_{mi}$ or $\theta_f$ after the application of the data or ellipse scale factor s.

In detail, With θ and s known, the magnetometer reading can be calibrated by rotating the reading by −θ, scaling the minor axis component by s, and then rotating the reading back to it's original orientation as indicated by Equation (16):

$$\begin{bmatrix} X_{cal} \\ Y_{cal} \end{bmatrix} = A \cdot B, . \qquad (16)$$

where $$A = \begin{bmatrix} \cos(\theta) & -\sin(\theta) \\ \sin(\theta) & \cos(\theta) \end{bmatrix} \begin{bmatrix} 1 & 0 \\ 0 & s \end{bmatrix} (\text{for } xr_{range} > yr_{range}),$$

$$B = \begin{bmatrix} \cos(-\theta) & -\sin(-\theta) \\ \sin(-\theta) & \cos(-\theta) \end{bmatrix} \begin{bmatrix} X_{val} \\ Y_{val} \end{bmatrix}.$$

Figure 4A:
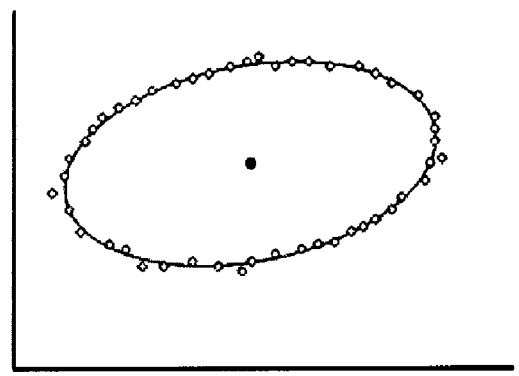
FIGS. 4A through 4E are diagrams illustrating intermediate results that are obtained during the calibration of raw data acquired by a compass sensor.
Figure 4B:
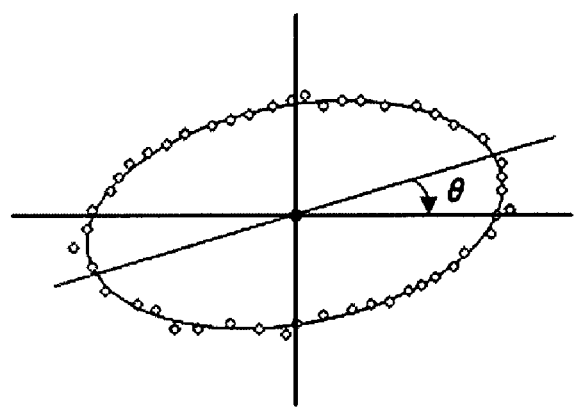
Figure 4C:
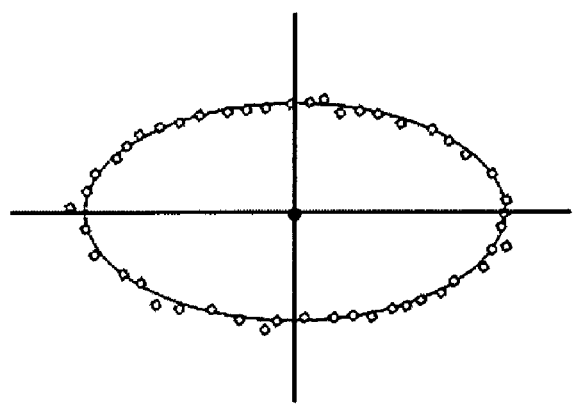
Figure 4D:
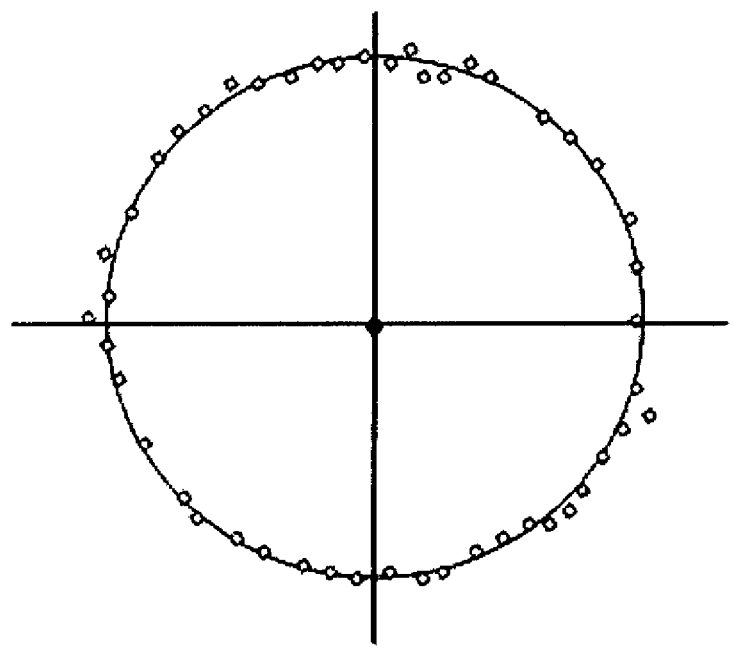
Figure 4E:
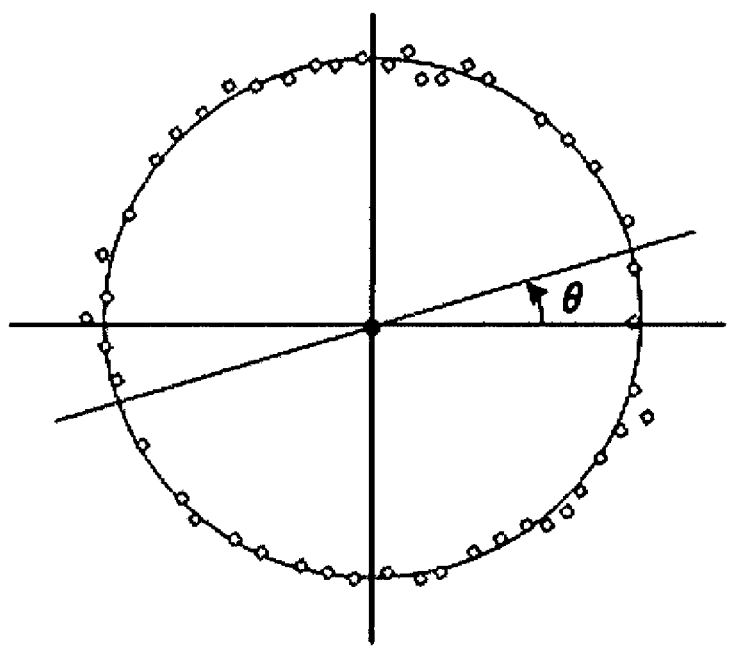

In the aforementioned manner, raw data or an elliptic function can be transformed into a circle which is centered at the origin. FIGS. 4A through 4E present intermediate results obtained during the calibration of raw data. Specifically, FIG. 4A illustrates results obtained by displaying raw data as a plurality of points and fitting the raw data to an ellipse, FIG. 4B illustrates results obtained by moving the raw data or an ellipse to which the raw data is fit so that the raw data or the ellipse can be centered at the origin, FIG. 4C illustrates results obtained by rotating the raw data or the ellipse clockwise by an angle θ corresponding to a soft iron error, FIG. 4D illustrates results obtained by applying a scale factor to pairs of coordinates corresponding to the minor axis of the rotated raw data or the rotated ellipse so that the rotated raw data or the rotated ellipse can be enlarged, and FIG. 4E illustrates results obtained by rotating the enlarged raw data or the enlarged ellipse counterclockwise by the angle θ so that the enlarged raw data or the enlarged ellipse can be transformed into a circle.

Referring to FIG. 1, in operation S140, after the transformation of the raw data or the ellipse into a circle, a distortion factor DF is calculated. The distortion factor DF is a coefficient indicating the degree to which a measurement operation performed by a compass magnetometer is affected by magnetic field interference. Factors that affect the distortion factor DF include the data soft iron error $\theta_{mi}$, an ellipse soft iron error $\theta_f$, and a phase shift. The distortion factor DF can be represented by the data soft iron error $\theta_{mi}$, the ellipse soft iron error $\theta_f$, the phase shift or a combination thereof.

For example, the distortion factor DF can be calculated using Equation (17):

$$DF = \theta_{mi} \cdot w1 \cdot \frac{(100 - Cmd)}{100} + (90 - \phi) \cdot w2 + \theta_f \cdot w3 + C \qquad (17)$$

where w1, w2, and w3 are weight coefficients, C is a constant, $\theta_{mi}$ indicates a soft iron error determined based on the raw data, i.e., the data soft iron error, $\theta_f$ indicates an soft iron error determined through fitting, i.e., the ellipse soft iron error, and φ indicates a phase shift of x and y values of the raw data, Cmd is the uniformity coefficient as in (19). The data soft iron error $\theta_{mi}$ can be calculated using Equations (11) and (12), and the ellipse soft iron error $\theta_f$ can be calculated using Equation (6).

However, the calculation of the distortion factor DF using Equation (17) is exemplary. In other words, the distortion factor DF can be determined in various manners. For example, a maximum of or an average of $\theta_{mi}$, $\theta_{mi}$, and 90-φ may be determined as the distortion factor DF. Alternatively, the distortion factor DF may be determined by applying a weight to each of $\theta_{mi}$, $\theta_{mi}$, and 90-φ and then averaging the results of the application.

Figure 5:
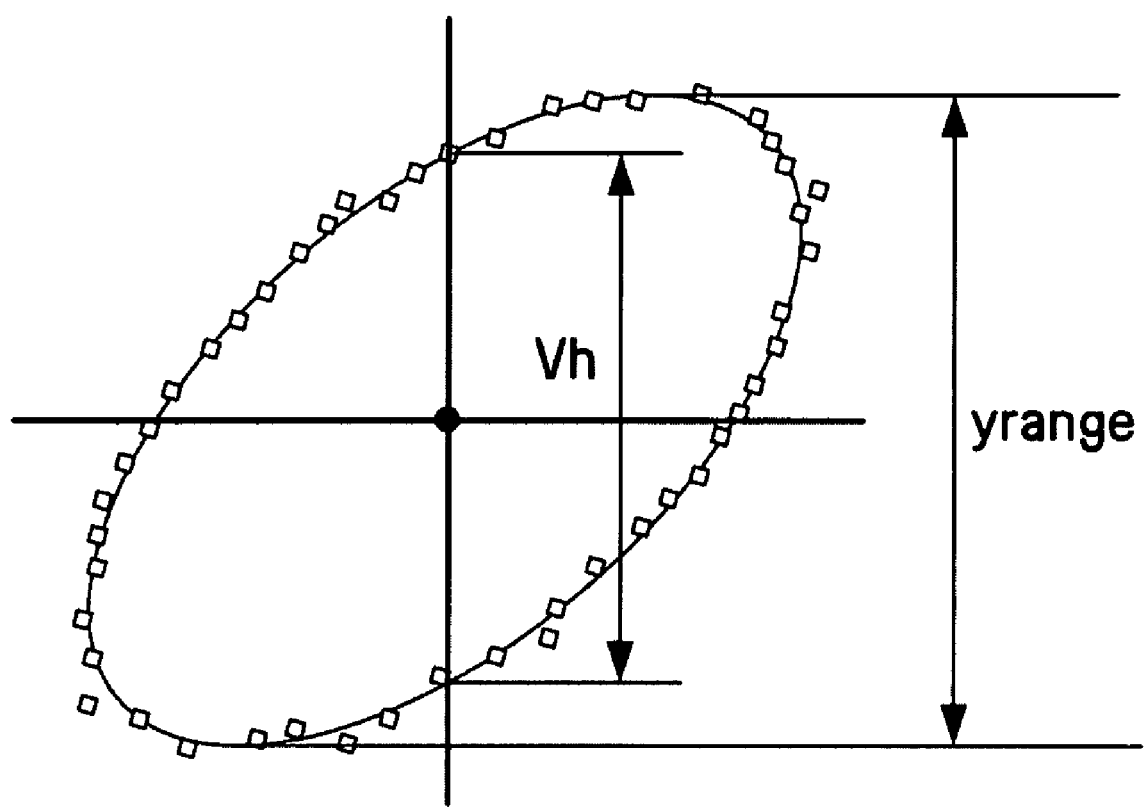
FIG. 5 is a diagram illustrating variables that are used to calculate of a phase shift.

FIG. 5 is a diagram for explaining variables used in the calculation of the phase shift φ. Referring to FIG. 5, the phase shift φ is a phase shift of x and y values of raw data. A circle has a phase shift of 90 degrees, whereas a distorted figure other than a circle, for example, an ellipse, has a phase shift of less than 90 degrees. Thus, the phase shift φ can be used to determine the distortion of raw data.

After the correction of the hard iron offsets $(X_{fc}, Y_{fc})$ and $(x_h, y_h)$, the phase shift φ can be calculated for a set of raw data that forms an ellipse, as indicated by Equation (18):

$$\varphi = \sin^{-1}\left(\frac{V_h}{y_{range}}\right) \cdot \left(\frac{180}{\pi}\right) \qquad (18)$$

where yrange indicates the range of y values of raw data acquired by the correction of the hard iron offsets ($X_{fc}$, $Y_{fc}$) and ($x_h$, $y_h$), and $V_h$ indicates the distance between the y-intercepts of the raw data.

Referring to FIG. 1, in operation S150, the quality of calibration QC is calculated. The quality of calibration QC is a coefficient indicating the quality of the raw data acquired by the compass sensor and the quality of the fitting of the raw data to an ellipse. Factors that affect the quality of calibration QC include a uniformity coefficient Cmd, an area ratio coefficient Rrf, and a fitting coefficient Rsq. The quality of calibration QC can be represented by the uniformity coefficient Cmd, the area ratio coefficient Rrf, the fitting coefficient Rsq, or a combination thereof.

The uniformity coefficient Cmd indicates how uniformly raw data is distributed in each quadrant. The uniformity coefficient Cmd can be calculated using Equation (19):

$$Cmd = \frac{\max_{i=1}^{4}(|num(i)|) - \min_{i=1}^{4}(|num(i)|)}{\sum_{i=1}^{4}|num(i)|} \cdot 100 \quad (19)$$

where num(i) indicates the number of data points that are located in an i-th quadrant. If the number of data points included in each quadrant is the same, then the uniformity coefficient Cmd has a value of 0, and it can be determined that a magnetometer has evenly acquired data from each quadrant by rotating a compass sensor 360 degrees.

The area ratio coefficient Rrf is the ratio of the area of raw data and the area of an ellipse to which the raw data is fit. The area ratio coefficient Rrf can be defined by Equation (20):

$$Rrf = \frac{Ar}{Af} \quad (20)$$

where Ar indicates the area of raw data, and Af indicates the area of an ellipse to which the raw data is fit. The area of raw data can be calculated by integrating the raw data using the trapezoidal rule or by integrating the raw data using the Surveyor's formula that can be applied to the integration of a polygonal with n sides. The area of an ellipse to which raw data is fit can be calculated using a typical method of calculating the area of an ellipse.

The fitting coefficient Rsq measures the degree to which a raw data value acquired by a compass sensor is similar to a data value obtained through fitting. The fitting coefficient Rsq can be calculated using the ratio of the variance of a data value obtained using an ellipse equation for fitting raw data to an ellipse and the variance of a raw data value acquired by a compass sensor, as indicated by Equation (21):

$$Rsq = \frac{\sum_{i=1}^{n}(Yf_i - \overline{Y}_f)^2}{\sum_{i=1}^{n}(Yr_i - \overline{Y}_h)^2} \quad (21)$$

where Yf indicates data values obtained using an ellipse equation, $\overline{Y}_f$ indicates the average of the data values Yf, Yr indicates y values of raw data acquired through filtering, and $\overline{Y}_h$ indicates the average of the y values Yr. The closer the fitting coefficient Rsq is to 1, the better the raw data fits to the corresponding ellipse equation.

For example, the quality of calibration QC can be represented by Equation (22):

$$QC = \text{Average}(\Sigma(100 - Cmd, Rrf \cdot 100, Rsq \cdot 100)) \quad (22).$$

However, a high quality of calibration QC does not necessarily mean a good quality of calibration. If the uniformity coefficient Cmd, the area ratio coefficient Rrf, and the fitting coefficient Rsq all have a value of 100, then the quality of calibration QC may have an ideal value of 100%. However, the quality of calibration QC may be greater than or less than 100. If the quality of calibration QC has a value of much greater than or much less than 100, then it may be determined that calibration has not been properly performed.

The calculation of the quality of calibration QC using Equation (22) is exemplary. In other words, the quality of calibration QC may be determined in various manners. For example, a maximum or minimum of 100−Cmd, Rrf×100, and Rsq×100 may be determined as the quality of calibration QC. Alternatively, the quality of calibration QC may be determined by applying a weight to each of 100−Cmd, Rrf×100, and Rsq×100, and averaging the results of the application.

As described above, raw data acquired by a compass sensor is fit to an ellipse, the ellipse is transformed into a circle, and then a distortion factor and the quality of calibration are calculated, thereby calibrating the compass sensor.

Figure 6:
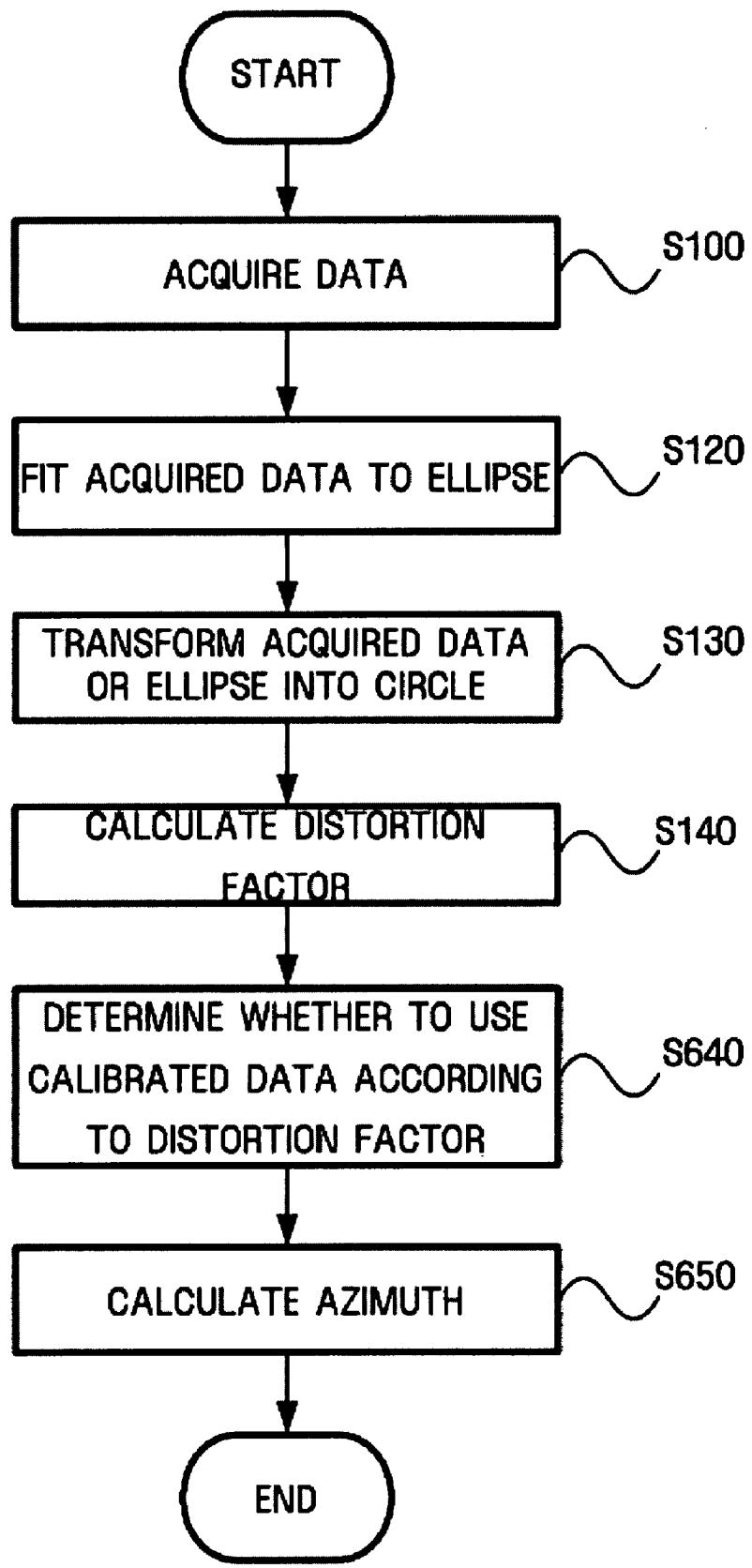
FIG. 6 is a flowchart illustrating a method of measuring azimuth by calculating a distortion factor according to an exemplary embodiment.

FIG. 6 is a flowchart illustrating a method of measuring azimuth by calculating a distortion factor according to an exemplary embodiment. Referring to FIG. 6, the method involves acquiring data (operation S100), fitting the acquired data to an ellipse (operation S110), transforming the acquired data or an ellipse function into a circle (operation S130), calculating a distortion factor (operation S140), determining whether to use calibrated data according to the distortion factor (operation S640), and calculating azimuth (operation S650).

Operations S100 through S140 have already been described in detail with reference to FIG. 1, and thus, detailed descriptions thereof will be skipped.

In operation S640, it is determined whether to use calibrated data of a compass sensor by determining whether the distortion factor calculated in operation S140 is within a predefined threshold range. For example, if the distortion factor is greater than a predefined threshold and has a large absolute value, then it may be determined that the surroundings of the compass sensor cause severe magnetic interference and that the calibrated data of the compass sensor is unreliable. The predefined threshold may be set to an experimentally determined value or a theoretically determined value.

In operation S650, if the distortion factor calculated in operation S140 is within the predefined threshold range, then the azimuth of the compass sensor is measured using the calibrated data of the compass sensor. Assuming that a biaxial compass sensor is calibrated by being rotated 360 degrees, magnetic force data is acquired from a direction toward which the compass sensor currently faces, and the acquired magnetic force data is mapped to calibrated data of the biaxial compass sensor, thereby determining a predetermined angle. The predetermined angle may be azimuth measured by the compass sensor.

Figure 7:
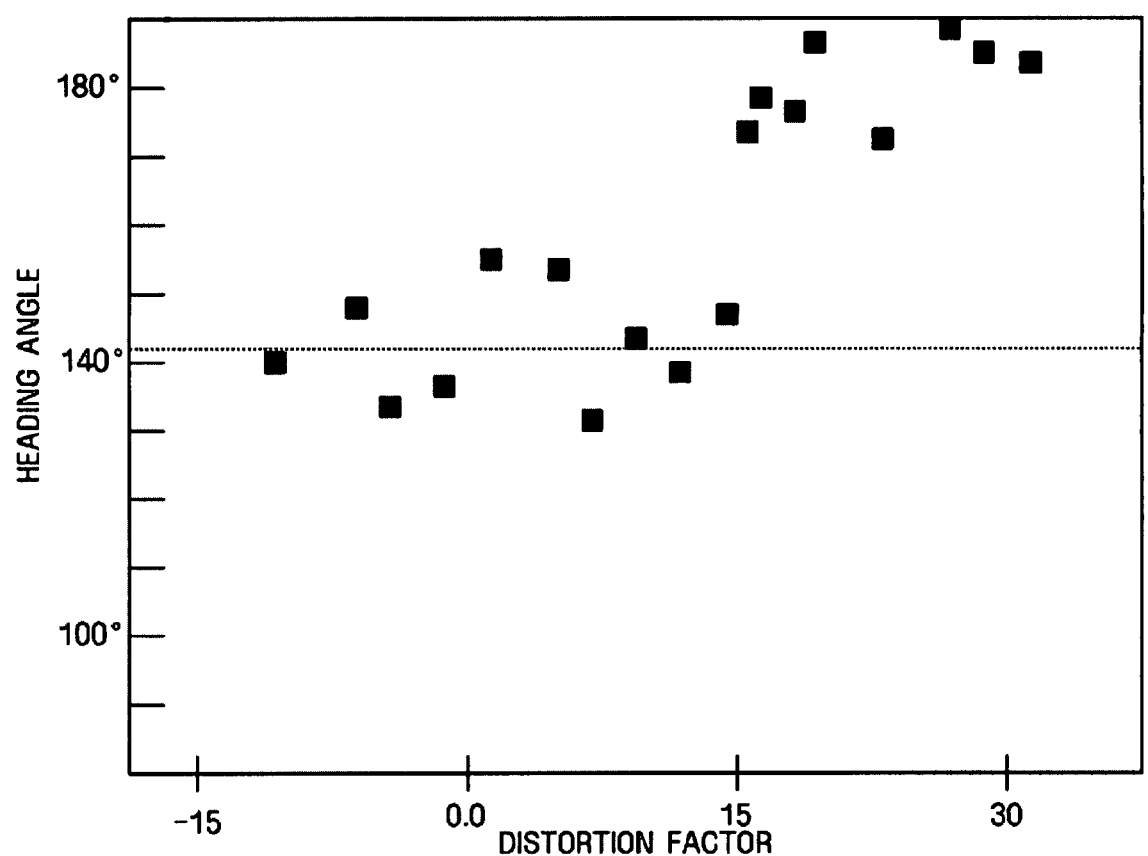
FIG. 7 is a diagram illustrating the pattern of a mobile robot azimuth distribution according to a distortion factor.

FIG. 7 is a diagram illustrating the pattern of a mobile robot azimuth distribution according to a distortion factor DF. Referring to FIG. 7, an absolute azimuth of an autonomous mobile robot may be 142 degrees. The distortion factor DF may be affected by magnetic interference, and the degree to which the distortion factor DF is affected by magnetic interference varies according to the location of the autonomous mobile robot and the surroundings of the autonomous mobile robot. As a result, the distortion factor DF may have a wide range of values. Referring to FIG. 7, the distortion factor DF is within the range of −10 and +30. However, the range of the distortion factor DF may be altered according to magnetic interference with the autonomous mobile robot.

Referring to FIG. 7, azimuth directions regarding the autonomous mobile robot that are recognized by a compass sensor according to the distortion factor DF are displayed as points. In detail, for a distortion factor DF of −10 to +15, the precision of azimuth data measured through calibration is within the range of ±10 degrees. On the other hand, for a distortion factor DF of +15 or greater, an azimuth of 170-190 degrees, which is much higher than the actual azimuth of the autonomous mobile robot, is measured through calibration. Therefore, experimental results illustrated in FIG. 7 indicate that azimuth measured when the distortion factor DF is too high is unreliable.

In this regard, a distortion factor can be used to determine whether and how much data acquired by a compass sensor after the calibration of the compass sensor is reliable. When magnetic interference with a compass sensor is too strong, it is difficult to properly handle the magnetic interference even by properly calibrating the compass sensor. Accordingly, the reliability of data acquired by a compass sensor can be determined based on a distortion factor.

If a distortion factor is within a predefined threshold range, the distortion factor can be used to measure the azimuth of a mobile robot and to control the movement of the mobile robot.

Figure 8:
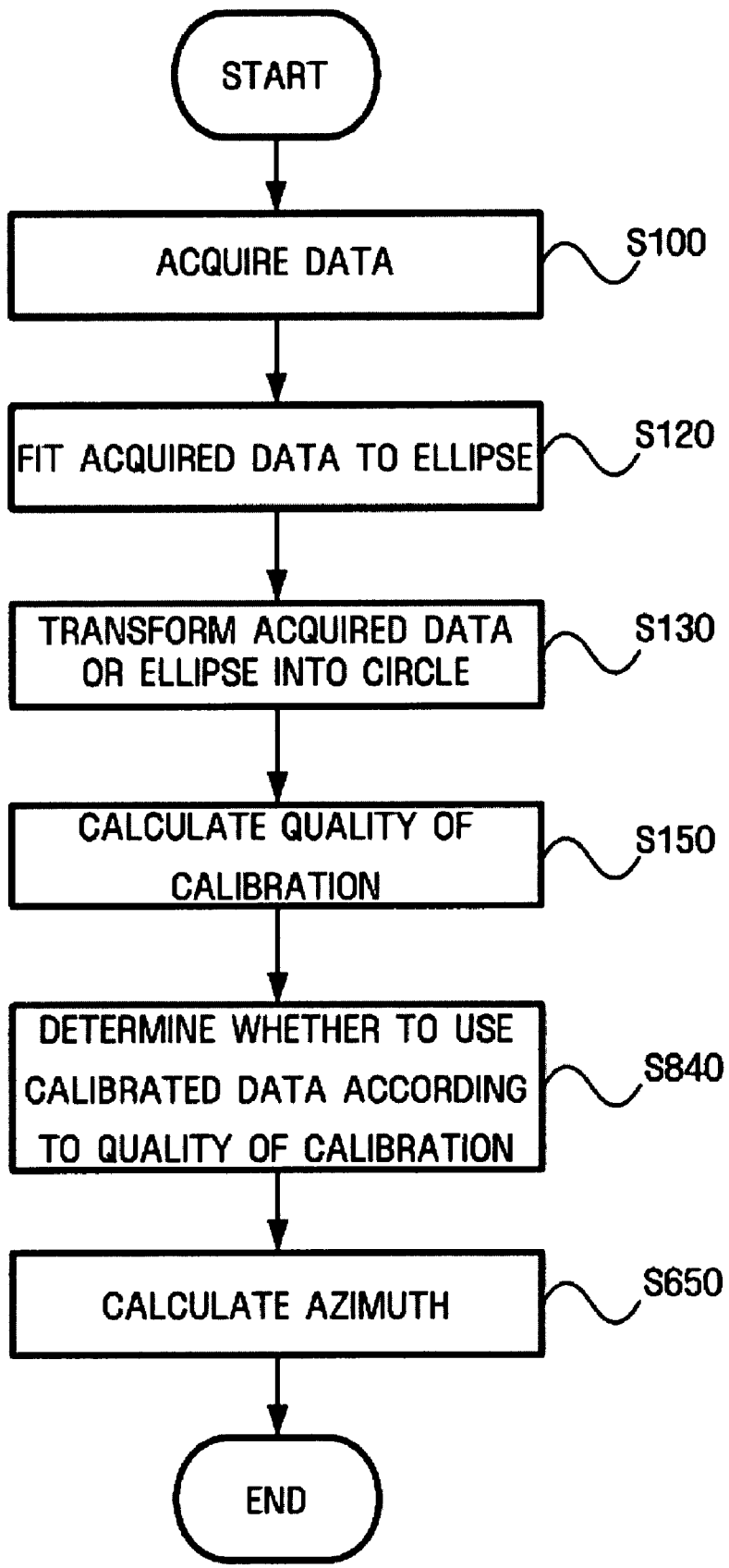
FIG. 8 is a flowchart illustrating a method of measuring azimuth by calculating the quality of calibration according to an exemplary embodiment.

FIG. 8 is a flowchart illustrating a method of measuring azimuth by calculating the quality of calibration according to an exemplary embodiment. Referring to FIG. 8, the method involves acquiring data (operation S100), fitting the acquired data to an ellipse (operation S110), transforming the acquired data or an ellipse function into a circle (operation S130), calculating the quality of calibration (operation S150), determining whether to use calibrated data according to the quality of calibration (operation S840), and calculating azimuth (operation S850).

Operations S100 through S130 and S150 have already been described in detail with reference to FIG. 1, and thus, detailed descriptions thereof will be skipped In operation S840, since the closer the quality of calibration is to 100, the more likely the calibration of a compass sensor is to have been properly performed, it is determined whether to use calibrated data of the compass sensor according to the quality of calibration determined in operation S150. In detail, the closer the quality of calibration is to 100, the more the calibrated data of the compass sensor is similar to raw data. Thus, a predefined threshold range (e.g., a threshold range of −90 to +110) regarding the quality of calibration is set. Then, if the quality of calibration determined in operation S150 is within the predefined threshold range, then the calibrated data of the compass sensor can be used. A threshold regarding the quality of calibration may be set to an experimentally determined value or a theoretically determined value.

Thereafter, in operation S650, if the quality of calibration determined in operation S150 is within the predefined threshold range, then azimuth measurement may be performed using the calibrated data of the compass sensor.

According to the present exemplary embodiment, not only the quality of calibration but also a distortion factor can be taken into consideration when performing azimuth measurement. In other words, if the quality of calibration and the distortion factor are both within respective corresponding threshold ranges, then it may be determined that a current magnetic environment causes no problem with azimuth measurement, and azimuth measurement may be performed.

Figure 9:
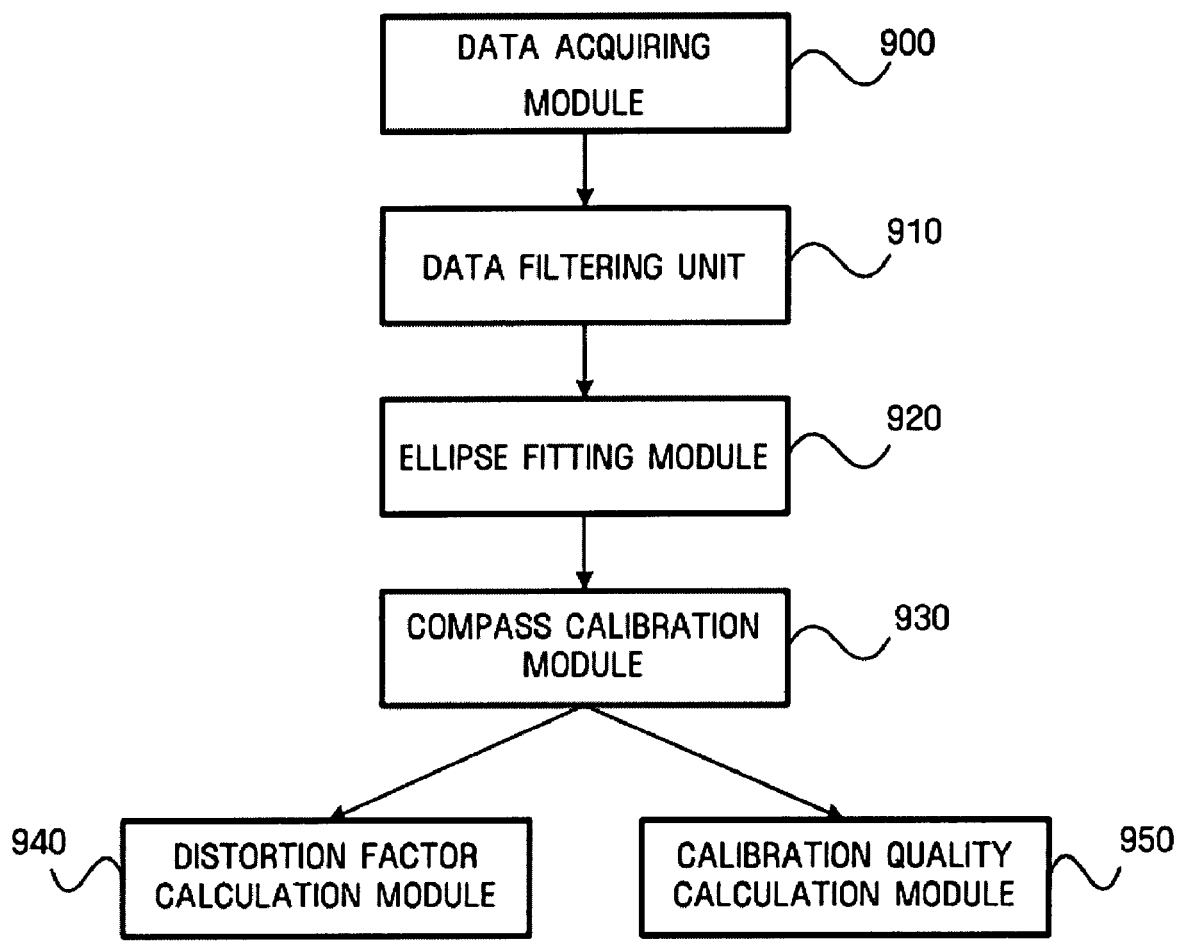
FIG. 9 is a block diagram of an apparatus for calibrating a compass sensor according to an exemplary embodiment.

FIG. 9 is a block diagram of an apparatus for calibrating a compass sensor in consideration of a magnetic environment according to an exemplary embodiment. Referring to FIG. 9, the apparatus includes a data acquiring module 900, a data filtering module 910, an ellipse fitting module 820, a compass calibration module 930, a distortion factor calculation module 940, and a calibration quality calculation module 950.

The data acquiring module 900 acquires magnetic force data using a biaxial compass sensor. In detail, the data acquiring module 900 acquires a plurality of data at regular intervals of time by rotating the biaxial compass sensor 360 degrees.

The data filtering module 910 removes magnetic force data that differs greatly from other magnetic force data acquired by the data acquiring module 900. In detail, the data filtering module 910 may compare a pair of magnetic force data respectively acquired from a pair of adjacent data points, deem the pair of magnetic force data unreliable if the pair of magnetic force data differs greatly from each other, and filter out the magnetic force data deemed unreliable. Alternatively, the data filtering module 910 may compare a plurality of magnetic force data respectively acquired from a plurality of adjacent data points, deem one of the plurality of magnetic force data that differs greatly from the rest of the plurality of magnetic force data unstable, and filter out the magnetic force data deemed unstable. Still alternatively, the data filtering module 910 may compare each magnetic force data with the average of several magnetic force data, deem magnetic force data that differs greatly from the average of the several magnetic force data, and filter out the magnetic force data deemed unreliable.

The ellipse fitting module 920 fits the magnetic force data acquired by the data acquiring module 910 to an ellipse using a second-order polynomial. In order to fit the acquired magnetic force data to an ellipse, the ellipse fitting module 920 may obtain a parameter vector using Equation (3) that can be derived by a constrained condition application module and with the aid of a Lagrange application module (not shown?) that determines a minimum using the Lagrange multiplier.

The compass calibration module 930 transforms raw data acquired by the biaxial compass sensor or an ellipse function obtained by fitting the raw data into a circle. In detail, the compass calibration module 930 calculates a hard iron offset, a soft iron error, and a scale factor. For this, the compass calibration module 930 may include an ellipse error calculator which calculates an ellipse hard iron offset, an ellipse soft iron error, and an ellipse scale factor using an ellipse equation, and a data error calculator which calculates a data hard iron offset, a data soft iron error, and a data scale factor using the acquired magnetic force data.

The compass calibration module 930 transforms the acquired magnetic force data or the ellipse function into a circle using a hard iron offset, a soft iron error, and a scale factor. In detail, the compass calibration module 930 moves data acquired by correcting the hard iron offset to the origin, rotates the data clockwise by a predetermined angle corresponding to the soft iron error, and transforms the data into a circle by applying the scale factor. Thereafter, the compass calibration module 930 rotates the data counterclockwise by the predetermined angle corresponding to the soft iron error, thereby completing the calibration of the biaxial compass sensor.

The distortion factor calculation module 940 calculates a distortion factor which is a coefficient indicating how much magnetic interference with the biaxial compass sensor affects a measurement operation performed by a compass magnetometer. Factors that affect the distortion factor include a data soft iron error, an ellipse soft iron error, and a phase shift. The distortion factor can be represented by a data soft iron error, an ellipse soft iron error, a phase shift or a combination thereof.

The calibration quality calculation module 950 calculates the quality of calibration. The quality of calibration may be determined by the uniformity coefficient Cmd defined by Equation (19), the area ratio coefficient Rrf defined by Equation (20), the fitting coefficient Rsq defined by Equation (21), or a combination thereof. Alternatively, the quality of calibration may be determined by the average of the uniformity coefficient Cmd, the area ratio coefficient Rrf, and the fitting coefficient Rsq.

FIG. 10 is a block diagram of an apparatus for measuring azimuth using a compass sensor according to an exemplary embodiment. Referring to FIG. 10, the apparatus includes a data acquiring module 900, an ellipse fitting module 910, a compass calibration module 930, a distortion factor calculation module 940, a calibration quality calculation module 950, and an azimuth calculation module 1000.

The data acquiring module 900, the ellipse fitting module 910, the compass calibration module 930, the distortion factor calculation module 940, and the calibration quality calculation module 950 are the same as their respective counterparts illustrated in FIG. 9, and thus, detailed descriptions thereof will be skipped. The operation of the azimuth calculation module 1000 will hereinafter be described in detail.

The azimuth calculation module 1000 calculates azimuth in a direction toward which a compass sensor currently faces, if a distortion factor or the quality of calibration is within a predefined threshold range. The experimental results illustrated in FIG. 7 indicate that the greater the distortion factor is, the lower the reliability of azimuth data acquired through the calibration of a compass sensor becomes. Therefore, the azimuth calculation module 1000 performs azimuth measurement only when the distortion factor or the quality of calibration is within a predefined threshold range. For example, assuming that a biaxial compass sensor is calibrated by being rotated 360 degrees and that the biaxial compass sensor currently faces a predetermined direction, the azimuth calculation module 1000 may acquire magnetic force data corresponding to the predetermined direction, and obtains a predetermined angle by mapping the acquired magnetic force data to calibrated data of the biaxial compass sensor. The predetermined angle corresponds to azimuth measured by the biaxial compass sensor.

In addition to the above-described exemplary embodiments, exemplary embodiments can also be implemented by executing computer readable code/instructions in/on a medium/media, e.g., a computer readable medium/media. The medium/media can correspond to any medium/media permitting the storing and/or transmission of the computer readable code/instructions. The medium/media may also include, alone or in combination with the computer readable code/instructions, data files, data structures, and the like. Examples of code/instructions include both machine code, such as produced by a compiler, and files containing higher level code that may be executed by a computing device and the like using an interpreter. In addition, code/instructions may include functional programs and code segments.

The computer readable code/instructions can be recorded/transferred in/on a medium/media in a variety of ways, with examples of the medium/media including magnetic storage media (e.g., floppy disks, hard disks, magnetic tapes, etc.), optical media (e.g., CD-ROMs, DVDs, etc.), magneto-optical media (e.g., floptical disks), hardware storage devices (e.g., read only memory media, random access memory media, flash memories, etc.) and storage/transmission media such as carrier waves transmitting signals, which may include computer readable code/instructions, data files, data structures, etc. Examples of storage/transmission media may include wired and/or wireless transmission media. The medium/media may also be a distributed network, so that the computer readable code/instructions are stored/transferred and executed in a distributed fashion. The computer readable code/instructions may be executed by one or more processors. The computer readable code/instructions may also be executed and/or embodied in at least one application specific integrated circuit (ASIC) or Field Programmable Gate Array (FPGA).

In addition, one or more software modules or one or more hardware modules may be configured in order to perform the operations of the above-described exemplary embodiments.

The term "module", as used herein, denotes, but is not limited to, a software component, a hardware component, a plurality of software components, a plurality of hardware components, a combination of a software component and a hardware component, a combination of a plurality of software components and a hardware component, a combination of a software component and a plurality of hardware components, or a combination of a plurality of software components and a plurality of hardware components, which performs certain tasks. A module may advantageously be configured to reside on the addressable storage medium/media and configured to execute on one or more processors. Thus, a module may include, by way of example, components, such as software components, application specific software components, object-oriented software components, class components and task components, processes, functions, operations, execution threads, attributes, procedures, subroutines, segments of program code, drivers, firmware, microcode, circuitry, data, databases, data structures, tables, arrays, and variables. The functionality provided for in the components or modules may be combined into fewer components or modules or may be further separated into additional components or modules. Further, the components or modules can operate at least one processor (e.g. central processing unit (CPU)) provided in a device. In addition, examples of a hardware components include an application specific integrated circuit (ASIC) and Field Programmable Gate Array (FPGA). As indicated above, a module can also denote a combination of a software component(s) and a hardware component(s). These hardware components may also be one or more processors.

The computer readable code/instructions and computer readable medium/media may be those specially designed and constructed for the purposes of exemplary embodiments, or they may be of the kind well-known and available to those skilled in the art of computer hardware and/or computer software.

As described above, exemplary embodiments have the following advantages.

First, by taking the quality of calibration and a distortion factor into consideration, it is possible to determine the quality of calibration of a compass sensor and the existence and intensity of magnetic interference with the compass sensor during the calibration of the compass sensor.

Second, it is possible to determine the reliability of data acquired by a compass sensor based on a distortion factor and the quality of calibration, and to decide whether to use predetermined azimuth data based on the results of the determination.

Although a few exemplary embodiments have been shown and described, it would be appreciated by those skilled in the art that changes may be made in these exemplary embodiments, the scope of which is defined in the claims and their equivalents.

What is claimed is:

1. A method of calibrating a compass sensor in consideration of a magnetic environment, the method comprising:
   (a) acquiring magnetic force data by rotating the compass sensor 360 degrees, the compass sensor comprising a biaxial magnetometer;
   (b) fitting the acquired magnetic force data to an ellipse function;
   (c) transforming the acquired magnetic force data and the ellipse function into a circle which is centered on an origin; and
   (d) calculating a distortion factor based on an inclination of a major axis of the ellipse function or the acquired magnetic force data to a horizontal axis, the distortion factor indicating the degree to which a magnetic field is distorted.

2. The method of claim 1, further comprising calculating quality of calibration by comparing the acquired magnetic force data and the ellipse function.

3. The method of claim 1, wherein the distortion factor is determined by one of a data soft iron error, an ellipse soft iron error, and a phase shift of the acquired magnetic force data in the x-axis and the y-axis, the data soft iron error corresponding to an inclination of a major axis of the acquired magnetic force data to a horizontal axis, and the ellipse soft iron error corresponding to an inclination of a major axis of an ellipse function to which the acquired magnetic force data is fit to the horizontal axis.

4. The method of claim 3, wherein the phase shift is an angle of a sine function value corresponding to a ratio of the sum of absolute values of two y-intercepts of predetermined data and a range of y value variations of the acquired magnetic force data, the predetermined data being obtained by moving the center of the acquired magnetic force data to the origin.

5. The method of claim 1, wherein the distortion factor is determined by a combination of a data soft iron error, an ellipse soft iron error, and a phase shift of the acquired magnetic force data in the x-axis and the y-axis, the data soft iron error corresponding to an inclination of a major axis of the acquired magnetic force data to a horizontal axis, and the ellipse soft iron error corresponding to an inclination of a major axis of the ellipse function to the horizontal axis.

6. The method of claim 2, wherein the quality of calibration is determined by one of a uniformity coefficient, an area ratio coefficient, and a fitting coefficient, the uniformity coefficient indicating whether magnetic force data has been evenly acquired from each direction with an angle of 0-360 degrees, the area ratio coefficient corresponding to a ratio of the area of the acquired magnetic force data and the area of an ellipse to which the acquired magnetic force data is fit, and the fitting coefficient corresponding to a ratio of the variance of the acquired magnetic force data and the variance of the ellipse.

7. The method of claim 2, wherein the quality of calibration is determined by a combination of a uniformity coefficient, an area ratio coefficient, and a fitting coefficient, the uniformity coefficient indicating whether magnetic force data has been evenly acquired from each direction with an angle of 0-360 degrees, the area ratio coefficient corresponding to a ratio of the area of the acquired magnetic force data and the area of an ellipse to which the acquired magnetic force data is fit, and the fitting coefficient corresponding to a ratio of the variance of the acquired magnetic force data and the variance of the ellipse.

8. The method of claim 1, wherein (a) comprises filtering the acquired magnetic force data by removing acquired magnetic force data that exceeds a predefined threshold.

9. A method of measuring the azimuth of a compass sensor in consideration of a magnetic environment, the method comprising:
   (a) acquiring magnetic force data by rotating a compass sensor 360 degrees, the compass sensor comprising a biaxial magnetometer;
   (b) fitting the acquired magnetic force data to an ellipse function;
   (c) transforming the acquired magnetic force data and the ellipse function into a circle which is centered on an origin;
   (d) calculating a distortion factor based on an inclination of a major axis of the ellipse function or the acquired magnetic force data to a horizontal axis, the distortion factor indicating the degree to which a magnetic field is distorted; and
   (e) calculating the azimuth of the compass sensor based on calibrated data of the compass sensor if the distortion factor is within a predefined threshold range.

10. A method of measuring the azimuth of a compass sensor in consideration of a magnetic environment, the method comprising:
    (a) acquiring magnetic force data by rotating a compass sensor 360 degrees, the compass sensor comprising a biaxial magnetometer;
    (b) fitting the acquired magnetic force data to an ellipse function;
    (c) transforming the acquired magnetic force data and the ellipse function into a circle which is centered on an origin;
    (d) calculating quality of calibration by comparing the acquired magnetic force data and the ellipse function; and
    (e) calculating the azimuth of the compass sensor based on calibrated data of the compass sensor if the quality of calibration is within a predefined threshold range.

11. A method of measuring the azimuth of a compass sensor in consideration of a magnetic environment, the method comprising:
    (a) acquiring magnetic force data by rotating a compass sensor 360 degrees, the compass sensor comprising a biaxial magnetometer;
    (b) fitting the acquired magnetic force data to an ellipse function;
    (c) transforming the acquired magnetic force data and the ellipse function into a circle which is centered on an origin;
    (d) calculating a distortion factor based on an inclination of a major axis of the ellipse function or the acquired magnetic force data to a horizontal axis, and calculating quality of calibration by comparing the acquired magnetic force data and the ellipse function, the distortion factor indicating the degree to which a magnetic field is distorted; and
    (e) calculating the azimuth of the compass sensor based on calibrated data of the compass sensor if the distortion factor and the quality of calibration are both within respective corresponding predefined threshold ranges.

12. An apparatus for calibrating a compass sensor in consideration of a magnetic environment, the apparatus comprising:
- a data acquiring module which acquires magnetic force data by rotating a compass sensor 360 degrees, the compass sensor comprising a biaxial magnetometer;
- an ellipse fitting module which fits the acquired magnetic force data to an ellipse function;
- a compass calibration module which transforms the acquired magnetic force data and the ellipse function into a circle which is centered on an origin; and
- a distortion factor calculation module which calculates a distortion factor based on an inclination of a major axis of the ellipse function or the acquired magnetic force data to a horizontal axis, the distortion factor indicating the degree to which a magnetic field is distorted.

13. The apparatus of claim 12, further comprising a calibration quality calculation module which calculates quality of calibration by comparing the acquired magnetic force data and the ellipse function.

14. The apparatus of claim 12, wherein the distortion factor is determined by one of a data soft iron error, an ellipse soft iron error, and a phase shift of the acquired magnetic force data in the x-axis and the y-axis, the data soft iron error corresponding to an inclination of a major axis of the acquired magnetic force data to a horizontal axis, and the ellipse soft iron error corresponding to an inclination of a major axis of an ellipse function to which the acquired magnetic force data is fit to the horizontal axis.

15. The apparatus of claim 14, wherein the phase shift is an angle of a sine function value corresponding to a ratio of the sum of absolute values of two y-intercepts of predetermined data and a range of y value variations of the acquired magnetic force data, the predetermined data being obtained by moving the center of the acquired magnetic force data to the origin.

16. The apparatus of claim 12, wherein the distortion factor is determined by a combination of a data soft iron error, an ellipse soft iron error, and a phase shift of the acquired magnetic force data in the x-axis and the y-axis, the data soft iron error corresponding to an inclination of a major axis of the acquired magnetic force data to a horizontal axis, and the ellipse soft iron error corresponding to an inclination of a major axis of the ellipse function to the horizontal axis.

17. The apparatus of claim 13, wherein the quality of calibration is determined by one of a uniformity coefficient, an area ratio coefficient, and a fitting coefficient, the uniformity coefficient indicating whether magnetic force data has been evenly acquired from each direction with an angle of 0-360 degrees, the area ratio coefficient corresponding to a ratio of the area of the acquired magnetic force data and the area of an ellipse function to which the acquired magnetic force data is fit, and the fitting coefficient corresponding to a ratio of the variance of the acquired magnetic force data and the variance of the ellipse.

18. The apparatus of claim 13, wherein the quality of calibration is determined by a combination of a uniformity coefficient, an area ratio coefficient, and a fitting coefficient, the uniformity coefficient indicating whether magnetic force data has been evenly acquired from each direction with an angle of 0-360 degrees, the area ratio coefficient corresponding to a ratio of the area of the acquired magnetic force data and the area of an ellipse function to which the acquired magnetic force data is fit, and the fitting coefficient corresponding to a ratio of the variance of the acquired magnetic force data and the variance of the ellipse.

19. The apparatus of claim 12, wherein the data acquiring module comprises a data filter which filters the acquired magnetic force data by removing acquired magnetic force data that exceeds a predefined threshold.

20. An apparatus for measuring the azimuth of a compass sensor in consideration of a magnetic environment, the apparatus comprising:
- a data acquiring module which acquires magnetic force data by rotating a compass sensor 360 degrees, the compass sensor comprising a biaxial magnetometer;
- an ellipse fitting module which fits the acquired magnetic force data to an ellipse function;
- a compass calibration module which transforms the acquired magnetic force data and the ellipse function into a circle which is centered on an origin;
- a distortion factor calculation module which calculates a distortion factor based on an inclination of a major axis of the ellipse function or the acquired magnetic force data to a horizontal axis, the distortion factor indicating the degree to which a magnetic field is distorted; and
- an azimuth calculation module which calculates the azimuth of the compass sensor based on calibrated data of the compass sensor if the distortion factor is within a predefined threshold range.

21. An apparatus for measuring the azimuth of a compass sensor in consideration of a magnetic environment, the apparatus comprising:
- a data acquiring module which acquires magnetic force data by rotating a compass sensor 360 degrees, the compass sensor comprising a biaxial magnetometer;
- an ellipse fitting module which fits the acquired magnetic force data to an ellipse function;
- a compass calibration module which transforms the acquired magnetic force data and the ellipse function into a circle which is centered on an origin;
- a calibration quality calculation module which calculates quality of calibration by comparing the acquired magnetic force data and the ellipse function; and
- an azimuth calculation module which calculates the azimuth of the compass sensor based on calibrated data of the compass sensor if the quality of calibration is within a predefined threshold range.

22. An apparatus for measuring the azimuth of a compass sensor in consideration of a magnetic environment, the apparatus comprising:
- a data acquiring module which acquires magnetic force data by rotating a compass sensor 360 degrees, the compass sensor comprising a biaxial magnetometer;
- an ellipse fitting module which fits the acquired magnetic force data to an ellipse function;
- a compass calibration module which transforms the acquired magnetic force data and the ellipse function into a circle which is centered on an origin;
- a distortion factor/calibration quality calculation module which calculates a distortion factor based on an inclination of a major axis of the ellipse function or the acquired magnetic force data to a horizontal axis, and calculates quality of calibration by comparing the acquired magnetic force data and the ellipse function, the distortion factor indicating the degree to which a magnetic field is distorted; and
- an azimuth calculation module which calculates the azimuth of the compass sensor based on calibrated data of the compass sensor if the distortion factor and the quality of calibration are both within respective corresponding predefined threshold ranges.

23. At least one computer readable medium storing computer readable instructions that control at least one processor to implement a method for calibrating a compass sensor in consideration of a magnetic environment, the method comprising:

fitting acquired magnetic force data acquired by the compass sensor to an ellipse function;

transforming the acquired magnetic force data and the ellipse function into a circle which is centered on an origin; and calculating a distortion factor based on an inclination of a major axis of the ellipse function or the acquired magnetic force data to a horizontal axis, the distortion factor indicating a degree to which a magnetic field is distorted.

24. At least one computer readable medium storing computer readable instructions that control at least one processor to implement a method for measuring the azimuth of a compass sensor in consideration of a magnetic environment, the method comprising:

fitting acquired magnetic force data acquired by the compass sensor to an ellipse function;

transforming the acquired magnetic force data and the ellipse function into a circle which is centered on an origin;

calculating a distortion factor based on an inclination of a major axis of the ellipse function or the acquired magnetic force data to a horizontal axis, the distortion factor indicating the degree to which a magnetic field is distorted; and calculating the azimuth of the compass sensor based on calibrated data of the compass sensor if the distortion factor is within a predefined threshold range.

25. At least one computer readable medium storing computer readable instructions that control at least one processor to implement a method of measuring the azimuth of a compass sensor in consideration of a magnetic environment, the method comprising:

fitting acquired magnetic force data acquired by the compass sensor to an ellipse function;

transforming the acquired magnetic force data and the ellipse function into a circle which is centered on an origin;

calculating quality of calibration by comparing the acquired magnetic force data and the ellipse function; and calculating the azimuth of the compass sensor based on calibrated data of the compass sensor if the quality of calibration is within a predefined threshold range.

26. At least one computer readable medium storing computer readable instructions that control at least one processor to implement a method of measuring the azimuth of a compass sensor in consideration of a magnetic environment, the method comprising:

fitting acquired magnetic force data acquired by the compass sensor to an ellipse function;

transforming the acquired magnetic force data and the ellipse function into a circle which is centered on an origin;

calculating a distortion factor based on an inclination of a major axis of the ellipse function or the acquired magnetic force data to a horizontal axis, and calculating quality of calibration by comparing the acquired magnetic force data and the ellipse function, the distortion factor indicating the degree to which a magnetic field is distorted; and calculating the azimuth of the compass sensor based on calibrated data of the compass sensor if the distortion factor and the quality of calibration are both within respective corresponding predefined threshold ranges.

* * * * *